(12) United States Patent
Kosowski et al.

(10) Patent No.: US 11,482,220 B1
(45) Date of Patent: Oct. 25, 2022

(54) CLASSIFYING VOICE SEARCH QUERIES FOR ENHANCED PRIVACY

(71) Applicant: Amazon Technologies, Inc., Seattle, WA (US)

(72) Inventors: Slawomir Kosowski, Gdynia (PL); Scott Carmack, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 153 days.

(21) Appl. No.: 16/708,199

(22) Filed: Dec. 9, 2019

(51) Int. Cl.
*G10L 15/22* (2006.01)
*G10L 15/26* (2006.01)
*G06N 5/02* (2006.01)
*G06F 21/62* (2013.01)

(52) U.S. Cl.
CPC .......... *G10L 15/22* (2013.01); *G06F 21/6245* (2013.01); *G06N 5/02* (2013.01); *G10L 15/26* (2013.01); *G10L 2015/223* (2013.01)

(58) Field of Classification Search
CPC .............................. G06F 21/6245; G10L 15/22
See application file for complete search history.

(56) References Cited

U.S. PATENT DOCUMENTS

| | | | |
|---|---|---|---|
| 2011/0029566 A1* | 2/2011 | Grandison | G06Q 10/10 707/783 |
| 2012/0023586 A1* | 1/2012 | Flickner | G06F 16/2455 726/25 |
| 2012/0291144 A1* | 11/2012 | Chen | G06Q 10/10 726/30 |
| 2015/0324600 A1* | 11/2015 | Sethi | G06F 21/6218 726/27 |
| 2017/0249430 A1* | 8/2017 | D'Souza | G16H 40/63 |
| 2017/0337397 A1* | 11/2017 | Tang | G06F 21/6227 |
| 2018/0330100 A1* | 11/2018 | Bar Joseph | H04W 12/08 |
| 2019/0139112 A1* | 5/2019 | Barday | G06Q 50/265 |
| 2020/0293678 A1* | 9/2020 | Feuz | H04L 51/16 |

* cited by examiner

*Primary Examiner* — Jialong He
(74) *Attorney, Agent, or Firm* — Eversheds Sutherland (US) LLP

(57) ABSTRACT

Devices, systems, and methods are provided for classifying voice search queries. A system may receive voice data associated with a voice utterance, the system being associated with a network. The system may determine that the voice data is associated with a question, and may determine an absence of an answer to the question. The system may determine a score associated with the question, the score indicative of a risk of disclosure of sensitive information associated with a person. The system may determine that the score fails to satisfy a threshold, and may send the question to a device, wherein the device is remote from the network. The system may receive data associated with the question.

20 Claims, 6 Drawing Sheets

CLASSIFYING VOICE SEARCH QUERIES FOR ENHANCED PRIVACY

BACKGROUND

Computer-based services are being used more frequently to answer user questions. When a person asks a question, a computer may determine and provide the answer to the user. However, some questions may include personal or sensitive information that computer-based services may need to protect. Computer-based services may benefit from improved detection of sensitive information when determining ways to answer a user's question.

Figure 1:
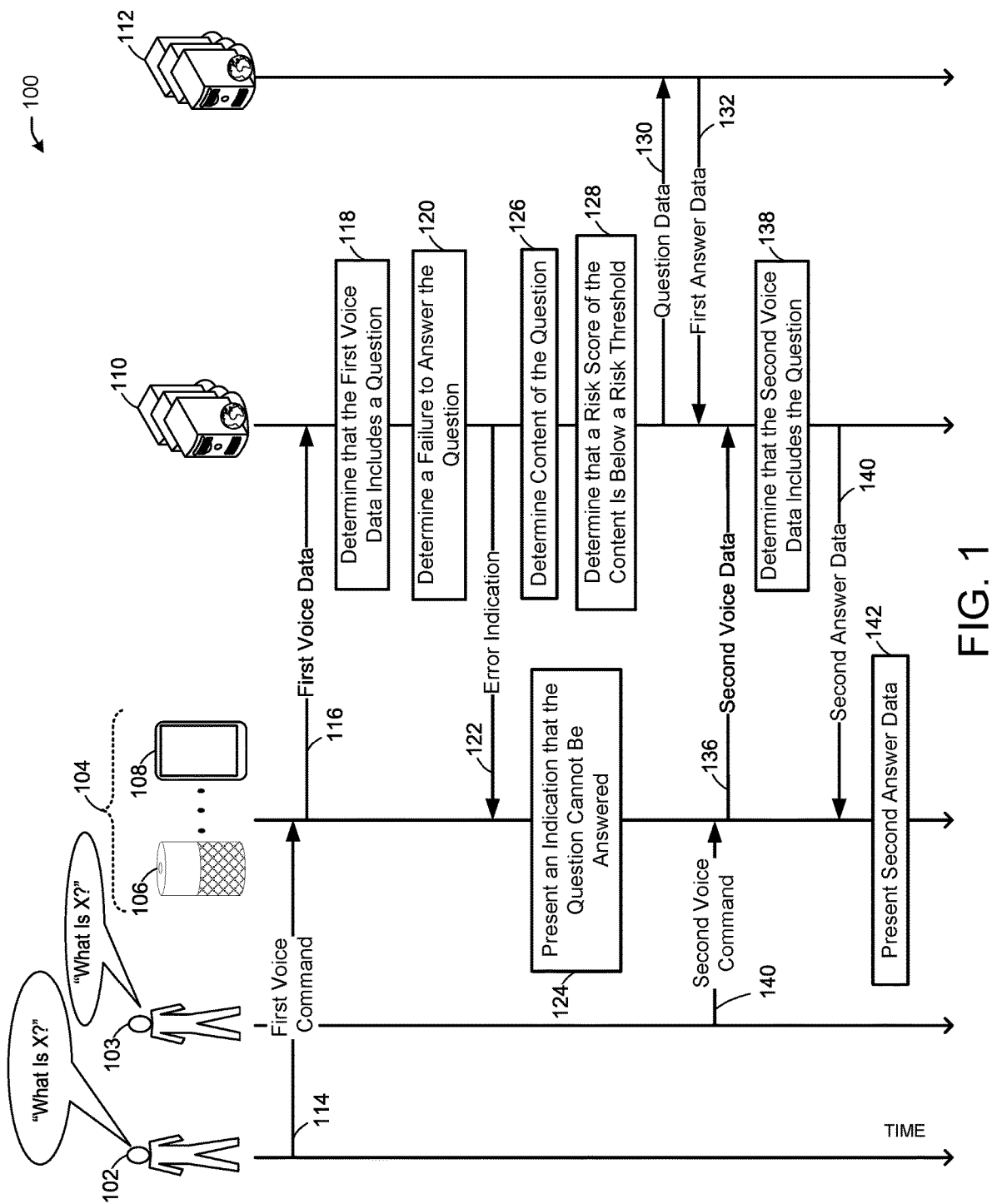
FIG. 1 illustrates an example process for classifying voice search queries, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for classifying voice search queries.

Computer systems may receive voice utterances, such as commands and questions, and may respond to the utterances. An utterance may indicate an intent, such as the intent to ask a question, the intent to control a device, the intent to select content to render, and the like. Computer systems may analyze voice utterances and identify the intent of the voice utterances. Computer systems may determine, based on the intent of a voice utterance, commands and/or content to present in response to an utterance. For example, when a computer system receives a voice utterance such as "Play Song A," the computer system may determine that the intent of the voice utterance is to render music, and that the music to render is Song A. The computer system may identify the content and provide the content to a device for playback. When a computer system receives a voice utterance in the form of a question, such as "What is the capital city of France?" the computer system may identify the intent of the voice utterance is to receive an answer to a question. The computer system may identify and provide the answer to the question, such as by sending a stream of audio in the form of a narrator providing an audio answer to the question, for example (or a stream of video, text, or other content to be presented).

Computer systems that answer voice-uttered questions may identify answers to questions based on both internal (e.g., local on a device or within a trusted network) and external (e.g., a secondary computer system with a lower trust level than the internal network) resources. For example, a computer system may maintain information in databases or other storage, and may use the information to identify the answers to voice-uttered questions. Sometimes, however, a computer system may not be able to determine answers to voice-uttered questions without requesting and/or retrieving information outside of a network. For example, a computer system may, with appropriate use permission and in accordance with relevant policies, laws, and regulations, provide received voice-uttered questions (e.g., in voice form or in text form after a voice-to-text translation) to resources outside of a network in the form of asking a question that someone who reads the question may answer. Rather than retrieving answers to questions based on user inputs, and then determining whether the answers include sensitive information or information otherwise objectionable, computer systems may evaluate the content of a question used to provide an answer before providing the question to any systems, devices, or other resources in search of an answer.

Because posting voice-uttered questions (or text translated from voice-uttered questions) in applications, application programming interfaces (APIs, such as search engine APIs), or resources of secondary computer systems may expose the person who asked a question to a risk of someone identifying sensitive information about the person (e.g., based on content of the question) and/or recognizing the person who asked the question, computer systems used to answer voice-uttered questions may benefit from assessing the risk of using secondary computer systems to answer a voice-uttered question while protecting sensitive information and user privacy.

In one or more embodiments, users may utter voice commands, questions, and other voice data to devices that are capable of detecting sound. For example, voice-enabled devices may respond to certain sounds, words (e.g., a wake word), phrases, gestures, inputs, and the like, to trigger the recording of a user's voice (using appropriate user consent and applicable laws and regulations). Voice-enabled devices may allow a user to control devices (e.g., request the playback of content, turn devices on and off, etc.), to purchase items (e.g., from an online retailer), and to ask for information, such as the weather, recipes, directions, trivia, news, and the like. For example, user voice utterances such as "What is the capital of China?" "What are the ingredients needed to make spaghetti sauce?" "What is the weather?" "What was the score of the game?" and other questions may be received and identified by voice-enabled devices. When a voice-enabled device identifies a question, such as by identifying a wake word or phrase followed by one or more words uttered by a user, the voice-enabled device may send voice data (e.g., a recording or other representation of the voice utterance) to a remote computer system (e.g., a cloud network) for analysis and an answer. For example, when the voice utterance is "What is the weather?" the voice-enabled device may rely on the remote computer system for an answer regarding the weather, and may announce or otherwise present the answer once the answer is provided (e.g., in the form of a voice recording to be rendered) to the voice-enabled device.

In one or more embodiments, the remote computer system may receive voice data from voice-enabled devices that received voice utterance commands or questions. The voice-enabled devices may send voice data to an endpoint at the remote computer system that may receive the voice data and send the voice data to an appropriate location, device, or system for analysis and translation. When the remote computer system receives voice data from a voice-enabled device, the voice data may include an intent (e.g., play content, ask a question, control a device, etc.) and a value (e.g., the content to be played, the question to answer, the device to control, etc.). The remote computer system may consider content templates to identify the intent of voice data. For example, the remote computer system may store or have access to templates with strings of words that are associated with questions. For example, a template may include entire questions (e.g., previously asked questions determined to be too risky or sufficiently low-risk) and/or questions with words and blanks, such as "What is the capital of _?" indicating that a user's intent is to ask a question regarding a capital city, and the "_" blank representing the location for which the capital city is inquired. The remote computer system may convert voice data to text using any voice-to-text method. Using the text, the remote computer system may match the text to a known phrase (e.g., a carrier phrase), such as "What is the capital of [blank]?" The remote computer system may identify the [blank] word as "Finland" in this example, and may analyze known data (e.g., a knowledge graph) to determine that Finland is a known entity (e.g., the knowledge graph includes the word Finland and information about Finland, such as its capital). Words, phrases, people, entities, and the like found in the knowledge graph may be safe for declassification (e.g., safe to disseminate to a secondary computer system). The remote computer system may determine, based on previously analyzed voice utterances, that the word Finland was uttered by a threshold number of users (e.g., based on a count of utterances from different devices and/or users). When a word is uttered more than a threshold number of times, the remote computer system may determine that the word is safe to be declassified. Determining that a word, phrase, or entity is safe for declassification may include any combination of these steps. The carrier phrase may include one or more [blank] words, and whether a question including the one or more [blank] words is safe for dissemination outside of the remote computer system may include an analysis of whether any of the one or more [blank] words is known and/or has been uttered a threshold number of times.

In one or more embodiments, the text of a voice-uttered question may match a carrier phrase partially (e.g., the question may not match every word or letter of a carrier phrase, but may match a threshold number of words or letters of a carrier phrase). When a threshold number of words or letters of a question match a carrier phrase and have been uttered a threshold number of times, the question may be safe for declassification. For example, when a question is "How old is Chris?" the question may be split into two halves—"How old is" and "Chris." The remote computer system may determine (e.g., using N-grams) that "How old is" and/or "Chris" have been uttered a respective threshold number of times, so the question "How old is Chris?" may be deemed safe to declassify.

In one or more embodiments, the remote computer system may receive or otherwise subscribe to information from public and/or private databases. For example, the remote computer system may ingest data from websites, libraries, forums, and other locations to store on the remote computer system. The ingested data may form a knowledge graph used to identify public entities, known information, and other data that is safe for declassification. When the remote computer system identifies a question included in received voice data, the remote computer system may extract or otherwise identify words or phrases of a question, and may match the words or phrases to an answer. Using the example of "What is the capital of Finland?" the remote computer system may retrieve answers from the data ingested from public and/or private databases (e.g., the remote computer system may identify that Finland is in the knowledge graph along with its capital city). In this manner, the remote computer system may identify the answers to questions without providing any data from the questions to resources outside of the remote computer network. For example, rather than posting a question using a public search engine or forum, the remote computer system may determine answers to questions without exposing potentially sensitive information associated with a person. However, in some situations, the remote computer system may not have an available answer within the remote computer system, and may rely on resources in one or more secondary computer systems to identify an answer to a received question.

In one or more embodiments, to avoid providing sensitive information associated with a person, such as a person's name, contact information, medical references, political or religious views, financial information, health information, or other sensitive data as further disclosed herein and/or as defined by applicable privacy laws and regulations and/or user preferences, the remote computer system (e.g., a proprietary system which protects the identity of users and their information, the proprietary system having a first trust level) may evaluate questions for their risk associated with disclosing sensitive information of people, and when the risk is low enough (e.g., below a threshold), the remote computer system may provide question data to resources in a secondary computer system (e.g., having a second trust level that is lower than the first trust level) to identify an answer. When the risk is too high (e.g., exceeds a threshold), the remote computer system may prevent the question from being provided to a secondary computer system to protect sensitive user information.

In one or more embodiments, to determine whether a question has information sensitive to a person, the remote computer system may consider a variety of criteria (e.g., score criteria), and may use any combination of manual and automatic evaluation. For example, human operators may evaluate questions and provide feedback to the remote computer system to use when evaluating whether questions include sensitive information that should not be provided to a secondary computer system. The remote computer system may determine (e.g., based on a location of the voice-enabled device from which the voice data was received) applicable data privacy policies, laws, and regulations, and sensitivity criteria (e.g., some information may be considered sensitive in some locations, but not in others, and/or a name may be known as a public figure, or declassified person, in one location, but not in another, etc.). Sensitivity criteria may include, but is not limited to, a full name (e.g., first and last name), a home address (e.g., a street name and/or number), an email address, a personal identifier (e.g., social security number, passport number, etc.), a vehicle number, a driver's license number, a credit card or bank account number, a user login name or handle, a date of birth, a birthplace, a genetic sequence, a telephone number, health-related information, legal information, rewards numbers, location data, racial/ethnic information, gender-related information, personal belief information, personal relationship information, and the like. The remote computer system may identify relevant local laws and regulations along with sensitivity criterion. When a question includes information that matches a sensitivity criteria, such as a string of numbers having the same length as a sensitive personal number or uttered in a question which asks who has the uttered sensitive personal numbers, or such as when a name is uttered and the name is not a known public figure (e.g., the name is likely associated with an individual whose information is unlikely to be ingested by the remote computer system), the remote computer system may prevent the question with the sensitive information being posted or otherwise provided to a secondary computer system. Known information from the knowledge graph may include intellectual property, movie titles, song titles or artists, book titles, landmarks, historic figures, brand names, product names, pop-culture words/expressions, known numbers (e.g., the famous 90210 zip code), recipes, and the like. When words from a question do not match data in the knowledge graph, such may be an indication of potentially sensitive information.

In one or more embodiments, the remote computer system may determine the number of times that a question has been asked by users (e.g., based on voice data received from multiple voice-enabled devices). The remote computer system may store questions and/or may maintain a tally of the number of times that voice data includes a question that matches (e.g., word-for-word, letter-for-letter) a previously asked question, or that is similar to a previously asked question (e.g., using N-grams to determine that a number of words in voice data includes a threshold number of N-grams). The more times that the computer system identifies a commonly asked question, the less likely that the question includes sensitive personal information that could be associated with a particular person. For example, when a question such as "What is the nearest bar in Small Town X?" is identified by the remote computer system, the remote computer system may determine that there are very few inhabitants in Small Town X, and therefore someone who saw the question posted in a public location may determine that the person who asked the question was asked by one of the few people who live in Small Town X, and could determine something about the person who asked the question. However, when a question is asked many times, such as "Where is the nearest Starbucks in Chicago?" the remote computer system may determine that the corpus of user information that an attacker may analyze to identify something about the person who asked the question is too large for the attacker to deduce anything about the questioner, so the remote computer system may determine that such a question (e.g., asked more than a threshold number of times) lacks sensitive information (e.g., determines an absence of sensitive information) and may be provided to a resource of a secondary computer system. The remote computer system may detect questions that have been previously asked in the exact same form, and/or that have been asked in different forms (e.g., "Where is the Eiffel Tower?" may be considered the same question as "Where in the world is the Eiffel Tower?"). The remote computer system may determine the number of times that a question was uttered by unique users and/or the number of times that a portion of a question (e.g., using N-gram analysis) was asked by unique users (e.g., frequently used N-grams).

A question template analysis may differ from a determination that a question has been uttered a threshold number of times. Question templates may be created using language ontology and relationships between entities. For example, a template may include a relationship in which <city> is the capital of <country>. Applying such a relationship between words, phrases, or entities of a question, a template may be created for use in analyzing whether a question is safe for declassification. The relationships may be used in a determination that a question has been uttered a threshold number of times. The combined use of question templates, the determination that a question has been uttered a threshold number of times, and knowledge graph matching to determine whether a question is safe for declassification may enhance the analysis of voice-uttered question, resulting in better protection of sensitive information and improved ability to provide answers to questions.

In one or more embodiments, the remote computer system may determine a score indicative of a disclosure of sensitive information associated with a person. The score may represent the likelihood that information in a question identified by the remote computer system from received voice data may include personal or otherwise sensitive information about a person (e.g., a person who asked the question or a person about whom the question was asked). The remote computer system may determine the number of times that a question has been asked by different users (e.g., the number of different voice-enabled devices from which voice data including a question have been identified), the type of information or data in a question, whether the information or data in a question includes sensitive information, such as character strings corresponding to a person's name, a number, a health-related term or phrase, a date, a location, or the like. The remote computer system may match the words determined from voice data (e.g., the words of a question) with data from the knowledge graph and/or other sources, and matching words in the knowledge graph and/or other sources may be indicative of whether the words of a question are likely to include sensitive information. The remote computer system may determine a risk score used to determine whether a question may be provided to a resource exterior to the remote computer system. A score may be based on manual review of a question and the feedback provided by manual review, indicating the likelihood that the question includes sensitive information. When the score indicates a high risk of undesirable disclosure of sensitive information, the question may not be provided to an exterior resource. When the score indicates that the question has a low risk of undesirable disclosure of sensitive information, the question may be provided to an exterior resource. Answers received from an exterior resource may be stored in the remote computer system and/or evaluated for their relevance to the question. When an answer is determined to be relevant (e.g., based on manual review), the answer may be stored for future use (e.g., a response to the same or similar question).

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes And Use Cases

FIG. 1 illustrates an example process 100 for classifying voice search queries, in accordance with one or more example embodiments of the present disclosure.

Referring to FIG. 1, the process 100 may include a user 102, a user 103, one or more voice-enabled devices 104 (e.g., device 106, device 108), a remote network 110 (e.g., a cloud-based network), and one or more external resources 112 (e.g., resources external to the remote network 110, such as Internet webpages, public search engine interfaces, etc.). At step 114, the user 102 may utter a first voice command, such as a question (e.g., "What is X?"). One of the voice-enabled devices 104 (e.g., the device 106) may receive the first voice command, and may send first voice data (e.g., a recording of the first voice command or other representation of the first voice command) to the remote network 110 at step 116. At step 118, the remote network 110 may determine the intent of the first voice data, such as an intent to ask a question. At step 120, the remote network 110 may determine a failure to answer the question based on data available on the remote network 110 (e.g., without the remote network 110 sending the question to a secondary computer system to identify an answer). For example, the remote network 110 may identify a commonly asked question (e.g., that the question has been identified more than a threshold number of times) and a stored answer for the commonly asked question. However, when no answer is identified for a question, the determination of step 120 may be that the remote network 110 has failed to answer the question. At step 122, the remote network 110 may send an error indication to the one or more voice-enabled devices 104 (e.g., the device 106) indicating that the remote network 110 was unable to answer the question. At step 124, the device 106 may present an indication that the question cannot be answered at this time (e.g., a playback presentation of a message such as "Sorry, I do not have the answer to your question.").

Still referring to FIG. 1, at step 126, the remote network 110 may determine content of the question. For example, the remote network 110 may convert the received first voice data to text that includes multiple character strings corresponding to words or phrases. The remote network 110 may determine whether the text matches (e.g., letter-for-letter or word-for-word, within a threshold distance of, sharing a number of N-grams with, etc.) an existing question stored in the remote network 110 (e.g., in a template or known question). At step 128, the remote network 110 may determine that a risk score of the content is below a risk threshold. For example, the remote network 110 may determine the risk score of a matching question or template, or may determine the risk score by determining an inclusion or absence of sensitive information in the question. When the risk score is below a risk threshold (e.g., lacks sensitive information that may be used to identify a person who is not a public figure), at step 130, the remote network 110 may send question data to the one or more external resources 112 (e.g., may post the question in an Internet forum, may send the question in a search interface or application programming interface of a search application, etc.) for analysis. At step 132, the remote network 110 may receive first answer data from the one or more external resources 112 (e.g., in the form of search results, user feedback, etc.). At step 140, the user 103 may utter a second voice command that may be the same as, or paraphrasing, the first voice command. The device 108 may receive the second voice command and, at step 136, may send second voice data (e.g., a recording or other representation of the second voice command) to the remote network 110. At step 138, the remote network 110 may determine that the second voice data includes the question previously asked. Because the remote network 110 has received the first answer data, the remote network 110 may be able to answer the question, unlike at step 120. At step 140, the remote network 110 may send second answer data (e.g., the same as the first answer data, a selected answer based on the first answer data, etc.) to the device 108. At step 142, the device 108 may present the second answer data (e.g., a voice narration of the answer to the question). For example, when the question is "What is the weather?" the second answer data may indicate the temperature, chance of rain/snow, and the like.

In one or more embodiments, the one or more voice-enabled devices 104 may respond to certain sounds, words (e.g., a wake word), phrases, gestures, inputs, and the like, to trigger the recording of a user's voice (using appropriate user consent and applicable laws and regulations). The one or more voice-enabled devices 104 may allow the user 102 and/or the user 103 to control devices (e.g., request the playback of content, turn devices on and off, etc.), to purchase items (e.g., from an online retailer), and to ask for information, such as the weather, recipes, directions, trivia, news, and the like. For example, the first voice command such as "What is the capital of China?" "What are the ingredients needed to make spaghetti sauce?" "What is the weather?" "What was the score of the game?" and other questions may be received and identified by the one or more voice-enabled devices 104 (e.g., at step 114 and step 140). When the one or more voice-enabled devices 104 identifies a voice utterance, the respective voice-enabled device may send the first voice data (e.g., a recording or other representation of the voice utterance) to the remote network 110 (e.g., step 116 and step 136).

In one or more embodiments, the remote network 110 may receive the first voice data from the one or more voice-enabled devices 104 that the voice utterances. When the remote network 110 receives the first voice data from the one or more voice-enabled devices 104, the voice data may include an intent (e.g., play content, ask a question, control a device, etc.) and a value (e.g., the content to be played, the question to answer, the device to control, etc.). The remote network 110 may consider known questions and/or templates to identify the intent of the voice data. The remote network 110 may convert the voice data to text using any voice-to-text method, and may extract words from the voice data. The words may be used to identify an answer to the question from answer databases. For example, when the words include some combination of "Who was the 20th President of the United States?" the remote network 110 may search for the 20th President of the United States from among stored data on the remote network 110, and may determine from the data that the answer is James Garfield.

In one or more embodiments, the remote network 110 may receive or otherwise subscribe to information from one or more sources. For example, the remote network 110 may ingest data from websites, libraries, forums, and other locations to store on the remote network 110. When the remote network 110 identifies a question included in the voice data, the remote network 110 may extract or otherwise identify words or phrases of a question, and may match the words or phrases to an answer. Using the example of "Who was the 20th President of the United States?" the remote network 110 may search and retrieve answers from the data stored in the remote network 110. In this manner, the remote network 110 may identify the answers to questions without providing any data from the questions to the one or more external resources 112. For example, rather than posting a question using a public search engine or forum (e.g., using the one or more external resources 112), the remote network 110 may determine answers to questions without exposing potentially sensitive information associated with a person. However, in some situations, the remote network 110 may not have an available answer within the remote network 110, and may rely on public resources to identify an answer to a received question.

In one or more embodiments, to avoid providing sensitive information associated with a person, such as a person's name, contact information, medical references, political or religious views, financial information, health information, or other sensitive data as further disclosed herein and/or as defined by applicable privacy laws and regulations and/or user preferences, the remote network 110 may evaluate questions for their risk associated with disclosing sensitive information of people, and when the risk is low enough (e.g., below a threshold), the remote network 110 may provide question data to the one or more external resources 112 to identify an answer. When the risk (e.g. score) is too high (e.g., exceeds a threshold), the remote network 110 may prevent the question data from being provided to the one or more external resources 112 to protect sensitive user information. In this manner, the remote network 110 may limit sending the question data for unanswered questions to situations when the question data does not include sensitive data that may be used to expose information about a person.

In one or more embodiments, to determine whether a question has information sensitive to a person, the remote network 110 may consider a variety of criteria (e.g., score criteria), and may use any combination of manual and automatic evaluation. The remote network 110 may determine (e.g., based on a location of the voice-enabled device from which the voice data was received) applicable data privacy laws and regulations, and sensitivity criteria (e.g., some information may be considered sensitive in some locations, but not in others, and/or a name may be known as a public figure in one location, but not in another, etc.). Sensitivity criteria may include, but is not limited to, a full name (e.g., first and last name), a home address (e.g., a street name and/or number), an email address, a personal identifier (e.g., social security number, passport number, etc.), a vehicle number, a driver's license number, a credit card or bank account number, a user login name or handle, a date of birth, a birthplace, a genetic sequence, a telephone number, health-related information, legal information, rewards numbers, location data, racial/ethnic information, gender-related information, personal belief information, personal relationship information, intellectual property, and the like. The remote network 110 may store relevant local laws and regulations along with sensitivity criterion. When a question includes information that matches a sensitivity criteria, such as a string of numbers having the same length as a sensitive personal number or uttered in a question which asks who has the uttered sensitive personal numbers, or such as when a name is uttered and the name is not a known public figure (e.g., the name is likely associated with an individual whose information is unlikely to be ingested by the remote network 110), the remote network 110 may prevent the question with the sensitive information being posted or otherwise provided to the one or more external resources 112.

In one or more embodiments, the remote network 110 may determine the number of times that a question has been asked by users (e.g., based on the voice data received from the one or more voice-enabled devices 104). The remote network 110 may store questions and/or may maintain a tally of the number of times that voice data includes a question that matches (e.g., word-for-word, letter-for-letter) a known question and/or template, or that is similar to a known question and/or template (e.g., using N-grams to determine that a number of words in voice data includes a threshold number of N-grams as a known question and/or template). The more times that the remote network 110 identifies a commonly asked question, the less likely that the question includes sensitive personal information that could be associated with a particular person.

In one or more embodiments, the remote network 110 may determine a score indicative of a disclosure of sensitive information associated with a person. The score may represent the likelihood that information in a question identified by the remote network 110 from the voice data may include personal or otherwise sensitive information about a person. The remote network 110 may determine the number of times that a question has been asked by different users (e.g., the number of the one or more voice-enabled devices 104 from which voice data including a question have been identified), the type of information or data in a question (e.g., step 126), whether the information or data in a question includes sensitive information, such as character strings corresponding to a person's name, a number, a health-related term or phrase, a date, a location, or the like. The remote network 110 may match the words determined from voice data (e.g., the words of a question) with the known question and/or templates, and based on the matching words and words that complete any blank words in the known question and/or template, may determine whether the words of a question are likely to include sensitive information. When a question includes an unknown entity, the remote network 110 may determine the entropy of a question, which may be directly or indirectly proportional to a risk score used to determine whether a question may be provided to a resource exterior to the remote computer system. A score may be based on manual review of a question and the feedback provided by manual review, indicating the likelihood that the question includes sensitive information. When the score indicates a high risk of undesirable disclosure of sensitive information, the question may not be provided to the one or more external resources 112. When the score indicates that the question has a low risk of undesirable disclosure of sensitive information, the question may be provided to the one or more external resources 112. Answers received from the one or more external resources 112 may be stored in the remote network 110 and/or evaluated for their relevance to the question. When an answer is determined to be relevant (e.g., based on manual review), the answer may be stored at the remote network 110 for future use (e.g., a response to the same or similar question).

In one or more embodiments, the one or more voice-enabled devices 104, the remote network 110, and/or the one or more external resources 112 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list. The remote network 110 may include one or more computer resources (e.g., a cloud-based computer network of one or more physical or virtual computers), and may be accessible by the one or more voice-enabled devices 104.

Figure 2:
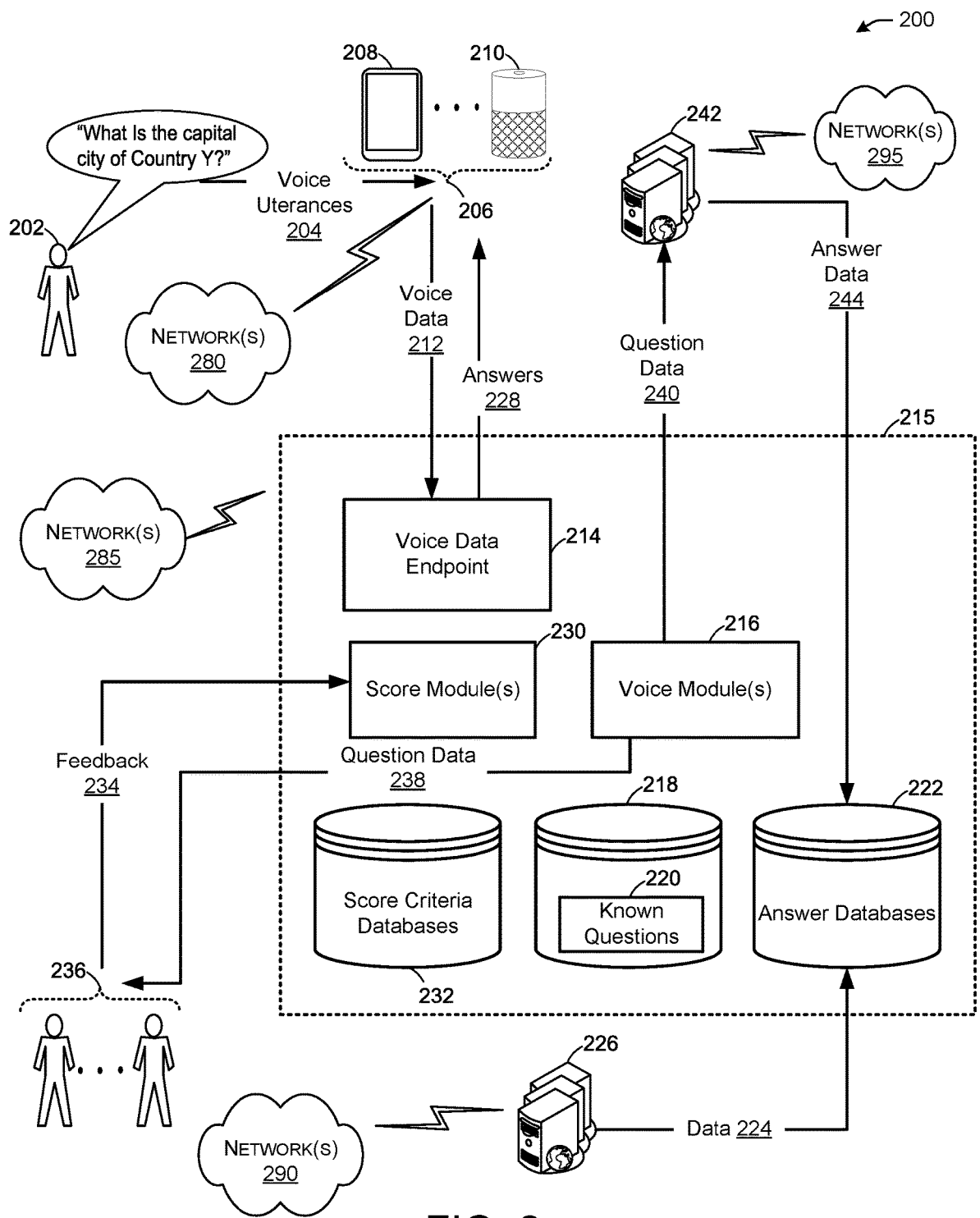
FIG. 2 illustrates a system for classifying voice search queries, in accordance with one or more example embodiments of the present disclosure.

FIG. 2 illustrates a system 200 for classifying voice search queries, in accordance with one or more example embodiments of the present disclosure.

Referring to FIG. 2, the system 200 may include a user 202 (e.g., similar to the user 102 of FIG. 1 and the user 103 of FIG. 1), who may utter voice utterances 204 (e.g., a question such as "What is the capital city of Country Y?"). The system 200 may include one or more voice enabled devices 206 (e.g., similar to the one or more voice-enabled devices 104 of FIG. 1), including device 208 and device 210, and which may receive and detect the voice utterances 204. The one or more voice-enabled devices 206 may send voice data 212 (e.g., similar to the first voice data of step 116 of FIG. 1 and to the second voice data of step 136 of FIG. 1) to a voice data endpoint 214 of a remote network 215 (e.g., similar to the remote network 110 of FIG. 1, referring to a network that protects information associated with its users). The remote network 215 may include one or more voice modules 216 that may analyze the voice data 212 to determine the intent (e.g., similar to step 118 of FIG. 1), which may include an intent to ask a question. The one or more voice modules 216 may search for previously asked or otherwise stored questions in question databases 218. For example, the question databases 218 may store known question and/or templates with character strings of words or phrases of known questions, and the known questions may be stored in the question databases 218 along with a count or tally of a number of times a respective question has been identified by the one or more voice modules 216 and/or a risk score indicative of a disclosure of sensitive information associated with a person (e.g., a risk of disclosing sensitive information if a question were to be provided to a secondary computer system). The one or more voice modules 216 may identify known answers from answer databases 222 (e.g., one or more knowledge graphs), or may determine answers to questions based on information stored in the answer databases. For example, the answer databases 222 may ingest data 224 from one or more sources 226 (e.g., Internet databases, private networks, etc.).

Still referring to FIG. 2, when the one or more voice modules 216 identifies answers 228 to a question, the voice data endpoint 214 may send the answers 228 to the one or more voice-enabled devices 206 for playback (e.g., recordings of answers, text of answers to be narrated, display data to be rendered, etc.). When the one or more voice modules 216 fails to identify an answer to a question based on the data 224 in the answer databases 222, the one or more voice modules 216 may evaluate whether the question may be provided to a secondary computer system to find an answer. The remote network 215 may include one or more score modules 230, which may determine a score of a question, the score indicative of a disclosure of sensitive information associated with a person. The score may be determined by the one or more score modules 230 using one or more score criteria databases 232, which may store applicable privacy laws and regulations, sensitivity criterion based on the location of the user 202, and feedback 234 provided by one or more human operators 236. For example, the one or more voice modules 216 may provide question data 238 (e.g., a question or portion of the question) to the one or more human operators 236 (e.g., based on a type and/or location of the question, such as the location of the user 202), and the one or more human operators 236 may provide the feedback 234 indicating whether the question is safe to outsource to a resource exterior of the remote network 215 to identify an answer. When the one or more score modules 230 provides a score for a question that fails to satisfy a threshold (e.g., indicating that the sensitivity risk of the question is low), the one or more voice modules 216 may send question data 240 (e.g., the question or portion of a question) to one or more external resources 242 (e.g., similar to the one or more external resources 112 of FIG. 1, and also referred to as "one or more secondary computer systems," which may be computer systems with a lower trust level than the primary system). For example, the one or more voice modules 216 may post all or a portion of a question (e.g., in the form of the question data 240) on a web page, via a search interface, via an application programming interface (API), or other method using a public or other resource that is external to the remote network 215. The one or more external resources 242 may send answer data 244 (e.g., search results, user feedback, Internet posts, etc.) to the remote network 215, and the answer data 244 may be stored in the answer databases 222 and used to determine an answer to the question whose answer was not available, and which caused the remote network 215 to send the question data 240 to the one or more external resources 242. In this manner, when the same or similar question is later identified by the remote network 215 from the voice data 212, the answer may be provided to the one or more voice-enabled devices 206 (e.g., similar to step 140 of FIG. 1).

In one or more embodiments, the one or more voice-enabled devices 206 may respond to certain sounds, words (e.g., a wake word), phrases, gestures, inputs, and the like, to trigger the recording of a user's voice (using appropriate user consent and applicable laws and regulations). The one or more voice-enabled devices 206 may allow the user 202 to control devices (e.g., request the playback of content, turn devices on and off, etc.), to purchase items (e.g., from an online retailer), and to ask for information, such as the weather, recipes, directions, trivia, news, and the like. For example, user voice utterances such as "What is the capital of China?" "What are the ingredients needed to make spaghetti sauce?" "What is the weather?" "What was the score of the game?" and other questions may be received and identified by the one or more voice-enabled devices 206

(e.g., at step 114 and step 140 of FIG. 1). When the one or more voice-enabled devices 104 identifies a voice utterance, the respective voice-enabled device may send voice data (e.g., a recording or other representation of the voice utterance) to a remote computer system (e.g., step 116 and step 136).

In one or more embodiments, the remote network 215 may receive the voice data 212 from the one or more voice-enabled devices 206 that received the voice utterances 204. When the remote network 215 receives the voice data 212 from the one or more voice-enabled devices 206, the voice data 212 may include an intent (e.g., play content, ask a question, control a device, etc.) and a value (e.g., the content to be played, the question to answer, the device to control, etc.). The remote network 215 may consider known questions 220 to identify the intent of the voice data 212. For example, the remote network 215 may store or have access to the known questions 220 with strings of words that are associated with questions that have been previously uttered. Using the text, the remote network 215 may match the text to a known phrase (e.g., a carrier phrase), such as "What is the population of [blank]?" The remote network 215 may identify the [blank] word as "India" in this example, and may analyze known data (e.g., a knowledge graph) to determine that India is a known entity (e.g., the knowledge graph includes the word India and information about India, such as its population). The remote network 215 may determine, based on previously analyzed voice utterances, that the word India and/or that all or a part of the question "What is the population of India" was uttered by a threshold number of users (e.g., based on a count of utterances from different devices and/or users). When a word/question is uttered more than a threshold number of times, the remote network 215 may determine that the word/question is safe to be declassified. Determining that a word, phrase, or entity of a question is safe for declassification may include any combination of these steps. The carrier phrase may include one or more [blank] words, and whether a question including the one or more [blank] words is safe for dissemination to a secondary computer system may include an analysis of whether any of the one or more [blank] words is known and/or has been uttered a threshold number of times.

In one or more embodiments, the remote network 215 may receive or otherwise subscribe to information from public and/or private databases (e.g., the one or more sources 226). For example, the remote network 215 may ingest data from websites, libraries, forums, and other locations to store on the remote network 215. When the remote network 215 identifies a question included in received voice data, the remote network 215 may extract or otherwise identify words or phrases of a question, and may match the words or phrases to an answer. Using the example of "What is the population of India?" the remote network 215 may retrieve answers from the data 224 stored on the remote network 215. In this manner, the remote network 215 may identify the answers to questions without providing any data from the questions to resources of a secondary computer system. For example, rather than posting a question using a public search engine or forum (e.g., using the one or more external resources 242), the remote network 215 may determine answers to questions without exposing potentially sensitive information associated with a person. However, in some situations, the remote network 215 may not have an available answer within the remote network 215, and may rely on public resources to identify an answer to a received question.

In one or more embodiments, to avoid providing sensitive information associated with a person, such as a person's name, contact information, medical references, political or religious views, financial information, health information, or other sensitive data as further disclosed herein and/or as defined by applicable privacy laws and regulations and/or user preferences, the remote network 215 may evaluate questions for their risk associated with disclosing sensitive information of people, and when the risk is low enough (e.g., below a threshold), the remote network 215 may provide the question data 240 to the one or more external resources 242 to identify an answer. When the risk is too high (e.g., exceeds a threshold), the remote network 215 may prevent the question from being provided to the one or more external resources 242 to protect sensitive user information.

In one or more embodiments, to determine whether a question has information sensitive to a person, the remote network 215 may consider a variety of criteria (e.g., score criteria), and may use any combination of manual and automatic evaluation. The remote network 215 may determine (e.g., based on a location of the voice-enabled device from which the voice data was received) applicable data privacy laws and regulations, and sensitivity criteria (e.g., some information may be considered sensitive in some locations, but not in others, and/or a name may be known as a public figure in one location, but not in another, etc.). Sensitivity criteria may include, but is not limited to, a full name (e.g., first and last name), a home address (e.g., a street name and/or number), an email address, a personal identifier (e.g., social security number, passport number, etc.), a vehicle number, a driver's license number, a credit card or bank account number, a user login name or handle, a date of birth, a birthplace, a genetic sequence, a telephone number, health-related information, legal information, rewards numbers, location data, racial/ethnic information, gender-related information, personal belief information, personal relationship information, and the like. The remote network 215 may identify relevant local laws and regulations along with sensitivity criterion. When a question includes information that matches a sensitivity criteria, such as a string of numbers having the same length as a sensitive personal number or uttered in a question which asks who has the uttered sensitive personal numbers, or such as when a name is uttered and the name is not a known public figure (e.g., the name is likely associated with an individual whose information is unlikely to be ingested by the remote network 215), the remote network 215 may prevent the question with the sensitive information being posted or otherwise provided to the one or more external resources 242.

In one or more embodiments, the remote network 215 may determine the number of times that a question has been asked by users (e.g., based on voice data received from the one or more voice-enabled devices 206). The remote network 215 may store questions and/or may maintain a tally of the number of times that voice data includes a question that matches (e.g., word-for-word, letter-for-letter) a known question and/or template, or that is similar to a known question and/or template (e.g., using N-grams to determine that a number of words in voice data includes a threshold number of N-grams as a known question and/or template). The more times that the remote network 215 identifies a commonly asked question, the less likely that the question includes sensitive personal information that could be associated with a particular person.

In one or more embodiments, the remote network 215 may determine a score indicative of a disclosure of sensitive information associated with a person. The score may represent the likelihood that information in a question identified by the remote network 215 from received voice data 212 may include personal or otherwise sensitive information about a person. The remote network 215 may determine the number of times that a question has been asked by different users (e.g., the number of the one or more voice-enabled devices 206 from which the voice data 212 including a question have been identified), the type of information or data in a question (e.g., step 126 of FIG. 1), whether the information or data in a question includes sensitive information, such as character strings corresponding to a person's name, a number, a health-related term or phrase, a date, a location, or the like. The remote network 215 may match the words determined from voice data (e.g., the words of a question) with a known question and/or template, and based on the matching words and words that complete any blank words in the template, may determine whether the words of a question are likely to include sensitive information (e.g., determine whether the words of the question are included in a knowledge graph or not). When a question includes an unknown entity, the remote network 215 may determine the entropy of a question, which may be directly or indirectly proportional to a risk score used to determine whether a question may be provided to a resource exterior to the remote computer system. A score may be based on manual review of a question and the feedback provided by manual review, indicating the likelihood that the question includes sensitive information. When the score indicates a high risk of undesirable disclosure of sensitive information, the question may not be provided to the one or more external resources 242. When the score indicates that the question has a low risk of undesirable disclosure of sensitive information, the question data 240 may be provided to the one or more external resources 242. The answer data 244 received from the one or more external resources 242 may be stored in the remote network 215 and/or evaluated for their relevance to the question. When an answer data 244 is determined to be relevant to a question (e.g., based on manual review), the answer may be stored at the remote network 215 for future use (e.g., a response to the same or similar question).

In one or more embodiments, the selection of the one or more human operators 236 may depend on nativity data (e.g., location data associated with the user 202 and/or the one or more voice-enabled devices 206). Nativity may be used for cultural context, particularly around names, public features, and other proper nouns. The one or more human operators 236 may use a thought experiment regarding whether they would be comfortable posting a given question (e.g., the question data 240) on a first page of a newspaper or website and making sure that the question would not be perceived as personal, sensitive or offensive content. The feedback 234 may include indications of whether the one or more human operators 236 consider the question data 238 as having sensitive information.

The one or more voice-enabled devices 206 may be configured to communicate via a communications network 280, the remote network 215 may be configured to communicate via a wireless communications network 285, the one or more sources 226 may be configured to communicate via a wireless communications network 290 wirelessly or wired, and the one or more external resources 242 may be configured to communicate via a wireless communications network 295 (e.g., the same or different wireless communications networks). The communications network 280, the communications network 285, the communications network 290, and/or the communications network 295 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 280, the communications network 285, the communications network 290, and/or the communications network 295 may have any suitable communication range associated therewith and may include, for example, global networks (e.g., the Internet), metropolitan area networks (MANs), wide area networks (WANs), local area networks (LANs), or personal area networks (PANs). In addition, communications network 280, the communications network 285, the communications network 290, and/or the communications network 295 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more voice-enabled devices 206, the remote network 215, the one or more sources 226, and/or the one or more external resources 242 may include any suitable processor-driven device including, but not limited to, a mobile device or a non-mobile, e.g., a static, device. For example, the one or more voice-enabled devices 206, the remote network 215, the one or more sources 226, and/or the one or more external resources 242 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Figure 3:
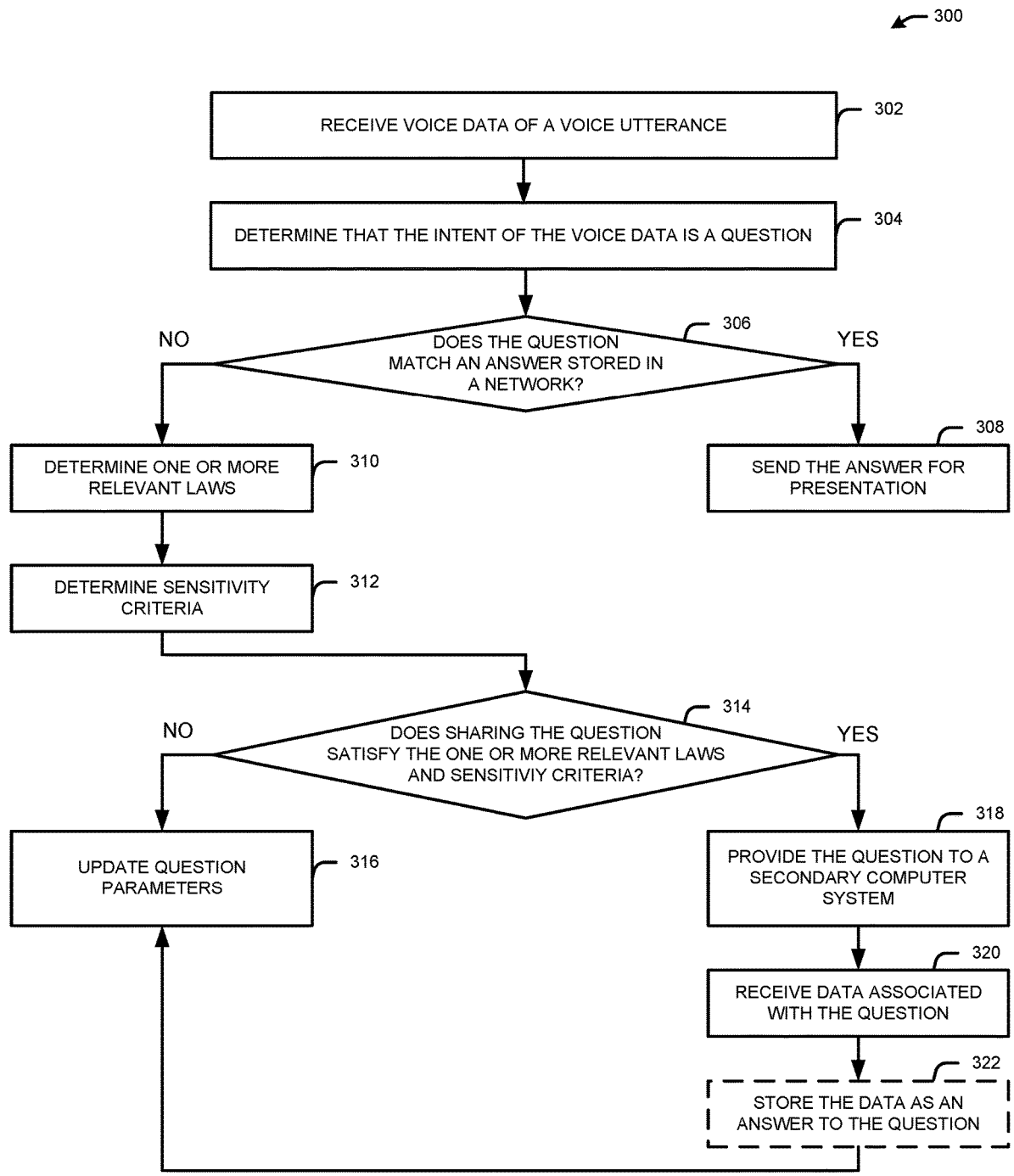
FIG. 3 illustrates a flow diagram for a process for classifying voice search queries, in accordance with one or more example embodiments of the present disclosure.

FIG. 3 illustrates a flow diagram for a process 300 for classifying voice search queries, in accordance with one or more example embodiments of the present disclosure.

At block 302, a system (e.g., the remote network 110 of FIG. 1, the remote network 215 of FIG. 2) may receive voice data (e.g., the first voice data of step 116 of FIG. 1, the voice data 212 of FIG. 2) indicative of a voice utterance (e.g., the first voice command of step 114 of FIG. 1, the voice utterances 204 of FIG. 2). The voice data may be a recording or other representation of a voice utterance received at another device (e.g., the one or more voice-enabled devices 104 of FIG. 1, the one or more voice-enabled devices 206 of FIG. 2). The voice data may be indicative of a user's intent (e.g., a question or command) and one or more values (e.g., content to render, controls to implement, the question being asked, etc.).

At block 304, the system may determine that the intent of the voice data is a question. For example, the system may convert the voice data to text, and may identify words or phrases in the text. When the words or phrases of the text match or are within a threshold distance from (e.g., a Levenshtein-Damerau distance) a known question or a template for a question (e.g., the known questions 220 of FIG. 2), the system may identify a question from the voice data.

At block 306, the system may determine whether the question matches an answer stored in the network (e.g., the remote network 110 of FIG. 1, the remote network 215 of FIG. 2). For example, known questions may map to known answers (e.g., in the answer databases 222 of FIG. 2), or the system may search for answers to the questions (e.g., using the words of phrases) based on data ingested from one or more sources (e.g., the one or more sources 226 of FIG. 2). The system may search for words or phrases of the question, and may identify relevant information stored on the system (e.g., network), such as a knowledge graph. The system may determine the answer to a question when one exists, and at block 308, may send the answer for presentation (e.g., step 140 of FIG. 1). When the system is unable to determine a matching answer to the question from the data stored on the system, the process 300 may continue to block 310.

At block 310, the system may determine one or more relevant laws (e.g., privacy laws or policies). For example, the system may determine (e.g., using location data received with the voice data) whether any laws, policies, or other governing rules apply to the location of the user who provided the voice data. At block 312, in addition to any relevant laws or policies, the system may determine sensitivity criteria (e.g., some information may be considered sensitive in some locations, but not in others, and/or a name may be known as a public figure in one location, but not in another, etc.). Sensitivity criteria may include, but is not limited to, a full name (e.g., first and last name), a home address (e.g., a street name and/or number), an email address, a personal identifier (e.g., social security number, passport number, etc.), a vehicle number, a driver's license number, a credit card or bank account number, a user login name or handle, a date of birth, a birthplace, a genetic sequence, a telephone number, health-related information, legal information, rewards numbers, location data, racial/ethnic information, gender-related information, personal belief information, personal relationship information, and the like. The remote computer system may identify relevant local laws and regulations along with sensitivity criterion. When a question includes information that matches a sensitivity criteria, such as a string of numbers having the same length as a sensitive personal number or uttered in a question which asks who has the uttered sensitive personal numbers, or such as when a name is uttered and the name is not a known public figure (e.g., the name is likely associated with an individual whose information is unlikely to be ingested by the remote computer system), the remote computer system may prevent the question with the sensitive information being posted or otherwise provided to a secondary computer system.

At block 314, the system may determine whether sharing the question (e.g., the question data 240 of FIG. 2) with a secondary computer system (e.g., the one or more external resources 112 of FIG. 1, the one or more external resources 242 of FIG. 2) satisfies the one or more relevant laws/policies, and satisfies the sensitivity criteria. Compliance with relevant laws/policies may include verifying that content of the voice data does not include certain sensitive information defined by the laws/policies and/or by user preferences (e.g., based on user opt-ins and opt-outs). Compliance with sensitivity criteria may include the system determining the number of times that a question has been asked by users (e.g., based on voice data received from multiple voice-enabled devices). The system may store questions and/or may maintain a tally of the number of times that voice data includes a question that matches (e.g., word-for-word, letter-for-letter) a known question and/or template, or that is similar to a known question and/or template (e.g., using N-grams to determine that a number of words in voice data includes a threshold number of N-grams as a known question and/or template). The more times that the system identifies a commonly asked question, the less likely that the question includes sensitive personal information that could be associated with a particular person. The system may determine that a question (e.g., asked more than a threshold number of times) lacks sensitive information (e.g., determines an absence of sensitive information based on whether the question includes data in a knowledge graph) and may be provided to a public resource of a secondary computer system. The system may determine whether one or more character strings of a question correspond to pronouns (e.g., names), numbers (e.g., personal information), personal beliefs, gender or sexual orientation, political or social organizational affiliations, ethnicity, or other possibly sensitive information about a person. When sharing the question with resources of a secondary computer system would not satisfy the relevant laws/policies or sensitivity criteria, the system may determine that the question is too sensitive to disseminate to a secondary computer system, and the process 300 may continue at block 316, where the system may update question parameters, such as the count or tally (e.g., increment the count or tally) indicating the number of times the question has been identified so that the system may eventually send the question to a secondary computer system once the question has been posed more than a threshold number of times by multiple users. When the system determines that sharing the question with a secondary computer system would not violate a law/policy and does not include sensitive data, the process 300 may continue at block 318. Other question parameters may include matching or partial matching information (e.g., whether the entire question matched received voice data or portions of the question matched the voice data).

At block 318, the system (e.g., a primary computer system with a highest trust level) may provide the question (e.g., the question data 240 of FIG. 2) to a secondary computer system (e.g., the one or more external resources 242 of FIG. 2). The secondary computer system may, at block 320, provide search results and/or user answers which may correspond to an answer to the question which the system was unable to answer internally. At block 322, the system may store the data as answer to the question when the system determines that the received data qualifies as an answer to the question.

Figure 4:
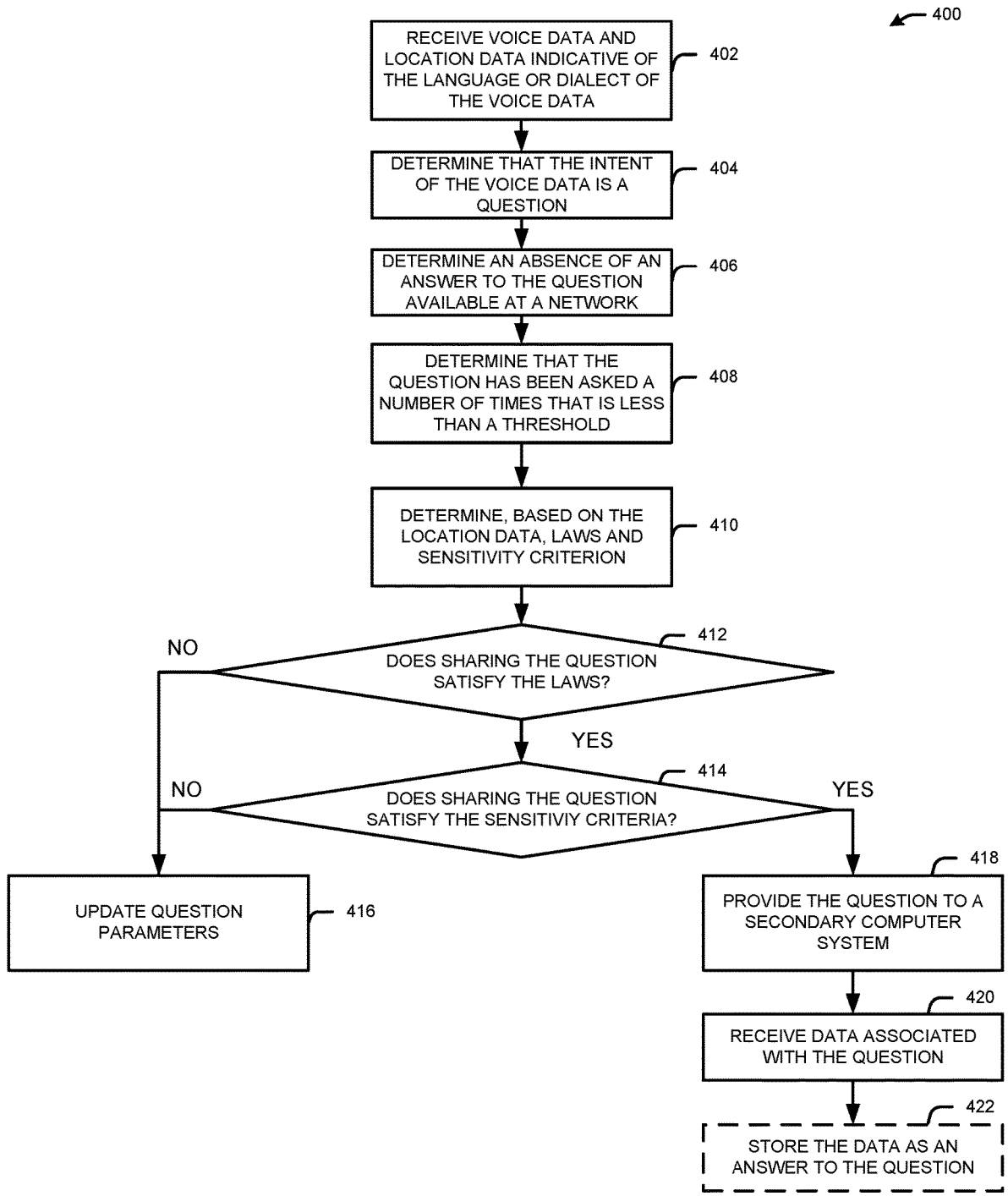
FIG. 4 illustrates a flow diagram for a process for classifying voice search queries, in accordance with one or more example embodiments of the present disclosure.

FIG. 4 illustrates a flow diagram for a process 400 for classifying voice search queries, in accordance with one or more example embodiments of the present disclosure.

At block 402, a system (e.g., the remote network 110 of FIG. 1, the remote network 215 of FIG. 2) may receive voice data (e.g., the first voice data of step 116 of FIG. 1, the voice data 212 of FIG. 2) indicative of a voice utterance (e.g., the first voice command of step 114 of FIG. 1, the voice utterances 204 of FIG. 2). The voice data may be a recording or other representation of a voice utterance received at another device (e.g., the one or more voice-enabled devices 104 of FIG. 1, the one or more voice-enabled devices 206 of FIG. 2). The voice data may be indicative of a user's intent (e.g., a question or command) and one or more values (e.g., content to render, controls to implement, the question being asked, etc.). The voice data may be received with location data, such as a location of the device which provided the voice data. The location data may not be a location that was uttered in the question (e.g., "Where is the Black Sea?"), but rather may be a local or country of the user who uttered the question (e.g., based on the location of the device), which may be indicative of a language or dialect of the voice data (e.g., English/USA, French/France, Mandarin/China, etc.).

At block 404, the system may determine that the intent of the voice data is a question. For example, the system may convert the voice data to text, and may identify words or phrases in the text. When the words or phrases of the text match or are within a threshold distance from (e.g., a Levenshtein-Damerau distance) a known question or a template for a question (e.g., the known questions 220 of FIG. 2), the system may identify a question from the voice data.

At block 406, the system may determine that the question does not match an answer stored in the network (e.g., the remote network 110 of FIG. 1, the remote network 215 of FIG. 2). For example, known questions may map to known answers (e.g., in the answer databases 222 of FIG. 2), or the system may search for answers to the questions (e.g., using the words or phrases) based on data ingested from one or more sources (e.g., the one or more sources 226 of FIG. 2). The system may search for words or phrases of the question, and may identify relevant information stored on the system (e.g., network). When the system is unable to determine a matching answer to the question from the data stored on the system, the process 400 may continue to block 408.

At block 410, the system may determine, based on the location data laws and sensitivity criterion. For example, the system may determine (e.g., using location data received with the voice data) whether any laws, policies, or other governing rules apply to the location of the user who provided the voice data. In addition to any relevant laws or policies, the system may determine sensitivity criteria (e.g., some information may be considered sensitive in some locations, but not in others, and/or a name may be known as a public figure in one location, but not in another, etc.). Sensitivity criteria may include, but is not limited to, a full name (e.g., first and last name), a home address (e.g., a street name and/or number), an email address, a personal identifier (e.g., social security number, passport number, etc.), a vehicle number, a driver's license number, a credit card or bank account number, a user login name or handle, a date of birth, a birthplace, a genetic sequence, a telephone number, health-related information, legal information, rewards numbers, location data, racial/ethnic information, gender-related information, personal belief information, personal relationship information, and the like. The remote computer system may identify relevant local laws and regulations along with sensitivity criterion. When a question includes information that matches a sensitivity criteria, such as a string of numbers having the same length as a sensitive personal number or uttered in a question which asks who has the uttered sensitive personal numbers, or such as when a name is uttered and the name is not a known public figure (e.g., the name is likely associated with an individual whose information is unlikely to be ingested by the remote computer system), the remote computer system may prevent the question with the sensitive information being posted or otherwise provided to a secondary computer system.

At block 412, the system (e.g., a primary system with a highest trust level) may determine whether sharing the question with a secondary computer system (e.g., the one or more external resources 112 of FIG. 1, the one or more external resources 242 of FIG. 2 would satisfy all relevant laws and policies. Compliance with relevant laws/policies may include verifying that content of the voice data does not include certain sensitive information defined by the laws/policies and/or by user preferences (e.g., based on user opt-ins and opt-outs). When the system determines that sharing the question with a secondary computer system would satisfy the relevant laws, the process 400 may continue at block 414. When the system determines that sharing the question with a secondary computer system would not satisfy the relevant laws, the process 400 may continue to block 416, where the system may update question parameters, such as the count or tally indicating the number of times the question has been identified so that the system may eventually send the question to a secondary computer system once the question has been posed more than a threshold number of times by multiple users. Other question parameters may include matching or partial matching information (e.g., whether the entire question matched received voice data or portions of the question matched the voice data).

At block 414, the system may determine whether sharing the question with a secondary computer system (e.g., the one or more external resources 112 of FIG. 1, the one or more external resources 242 of FIG. 2 would satisfy all sensitivity criteria. Compliance with sensitivity criteria may include the system determining the number of times that a question has been asked by users (e.g., based on voice data received from multiple voice-enabled devices). The system may store questions and/or may maintain a tally of the number of times that voice data includes a question that matches (e.g., word-for-word, letter-for-letter) a known question and/or template, or that is similar to a known question and/or template (e.g., using N-grams to determine that a number of words in voice data includes a threshold number of N-grams as a known question and/or template). The more times that the system identifies a commonly asked question, the less likely that the question includes sensitive personal information that could be associated with a particular person. The system may determine that a question (e.g., asked more than a threshold number of times) lacks sensitive information (e.g., determines an absence of sensitive information) and may be provided to a resource of a secondary computer system. The system may determine whether one or more character strings of a question correspond to pronouns (e.g., names), numbers (e.g., personal information), personal beliefs, gender or sexual orientation, political or social organizational affiliations, ethnicity, or other possibly sensitive information about a person, or corresponds to intellectual property, a work of art, a recipe, a known location, and the like (e.g., based on a knowledge graph of information known to be recognized by the public). When sharing the question with resources of a secondary computer system would not satisfy the relevant laws/policies or sensitivity criteria, the system may determine that the question is too sensitive to disseminate to a secondary computer system, and the process 400 may continue at block 416. When the system determines that sharing the question with a secondary computer system resource satisfies the sensitivity criteria, the process 400 may continue at block 418.

At block 418, the system may provide the question (e.g., the question data 240 of FIG. 2) to a secondary computer system (e.g., the one or more external resources 242 of FIG. 2). The system may post the question or a portion of the question on a public forum, in a search engine, or other resources which may, at block 420, provide search results and/or user answers which may correspond to an answer to the question which the system was unable to answer internally. At block 422, the system may store the data as answer to the question when the system determines that the received data qualifies as an answer to the question.

Figure 5:
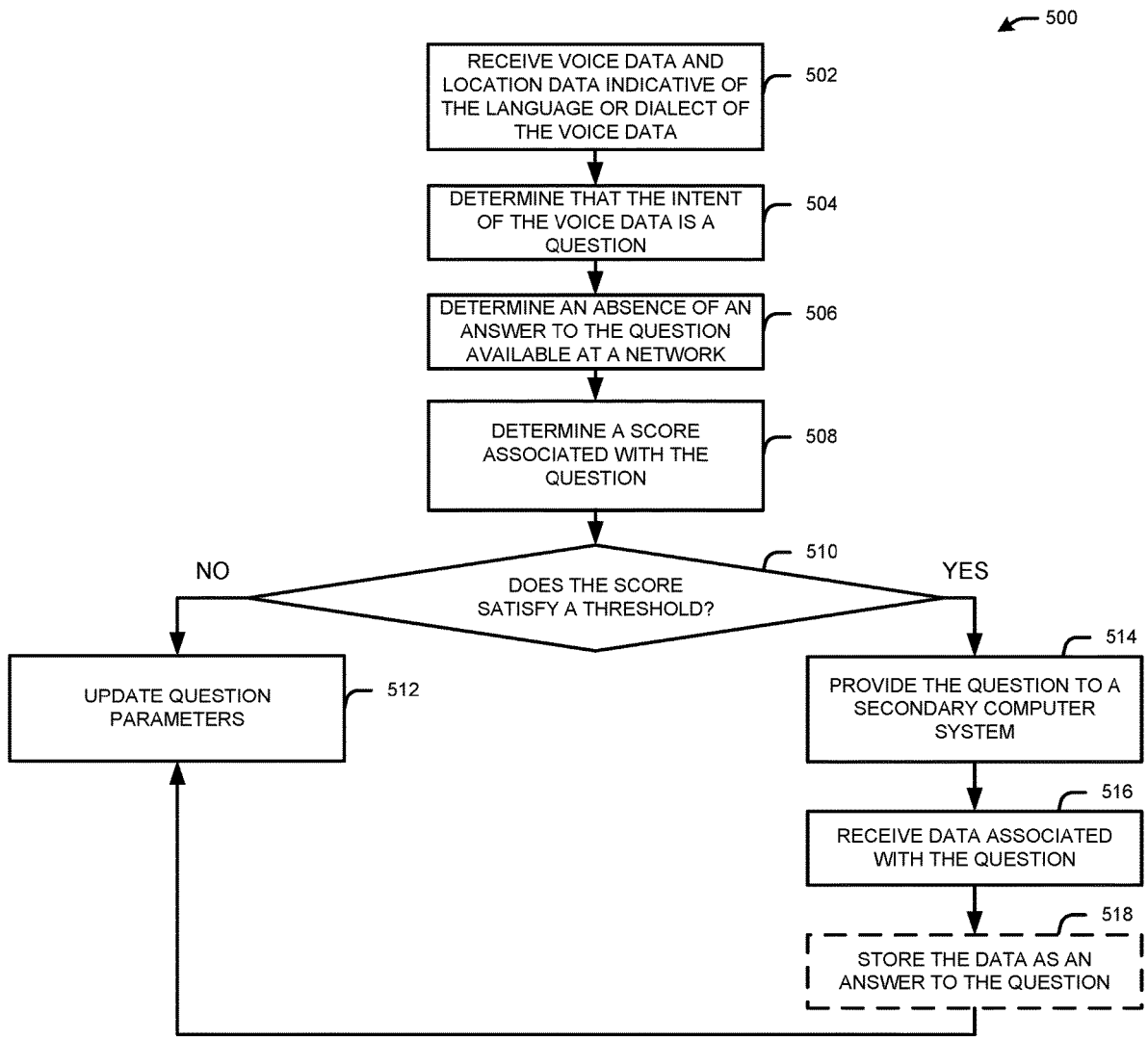
FIG. 5 illustrates a flow diagram for a process for classifying voice search queries, in accordance with one or more example embodiments of the present disclosure.

FIG. 5 illustrates a flow diagram for a process 500 for classifying voice search queries, in accordance with one or more example embodiments of the present disclosure.

At block 502, a system (e.g., the remote network 110 of FIG. 1, the remote network 215 of FIG. 2) may receive voice data (e.g., the first voice data of step 116 of FIG. 1, the voice data 212 of FIG. 2) indicative of a voice utterance (e.g., the first voice command of step 114 of FIG. 1, the voice utterances 204 of FIG. 2). The voice data may be a recording or other representation of a voice utterance received at another device (e.g., the one or more voice-enabled devices 104 of FIG. 1, the one or more voice-enabled devices 206 of FIG. 2). The voice data may be indicative of a user's intent (e.g., a question or command) and one or more values (e.g., content to render, controls to implement, the question being asked, etc.). The voice data may be received with location data, such as a location of the device which provided the voice data. The location data may not be a location that was uttered in the question (e.g., "Which countries border Germany?"), but rather may be a local or country of the user who uttered the question (e.g., based on the location of the device), which may be indicative of a language or dialect of the voice data.

At block 504, the system may determine that the intent of the voice data is a question. For example, the system may convert the voice data to text, and may identify words or phrases in the text. When the words or phrases of the text match or are within a threshold distance from (e.g., a Levenshtein-Damerau distance) a known question or a template for a question (e.g., the known questions 220 of FIG. 2), the system may identify a question from the voice data. The text may completely or partially match a known question and/or a known question that at least partially matches the text may have been identified a threshold number of times indicating a commonly asked question that may be declassified.

At block 506, the system may determine that the question does not match an answer stored in the network (e.g., the remote network 110 of FIG. 1, the remote network 215 of FIG. 2). For example, known questions may map to known answers (e.g., in the answer databases 222 of FIG. 2), or the system may search for answers to the questions (e.g., using the words of phrases) based on data ingested from one or more sources (e.g., the one or more sources 226 of FIG. 2). The system may search for words or phrases of the question, and may identify relevant information stored on the system (e.g., network). When the system is unable to determine a matching answer to the question from the data stored on the system, the process 500 may continue to block 508.

At block 508, the system may determine a score associated with the question. The score may be indicative of a disclosure of sensitive information associated with a person. Sensitive information may include, but is not limited to, a full name (e.g., first and last name), a home address (e.g., a street name and/or number), an email address, a personal identifier (e.g., social security number, passport number, etc.), a vehicle number, a driver's license number, a credit card or bank account number, a user login name or handle, a date of birth, a birthplace, a genetic sequence, a telephone number, health-related information, legal information, rewards numbers, location data, racial/ethnic information, gender-related information, personal belief information, personal relationship information, and the like. The remote computer system may identify relevant local laws and regulations along with sensitivity criterion. When a question includes information that matches a sensitivity criteria, such as a string of numbers having the same length as a sensitive personal number or uttered in a question which asks who has the uttered sensitive personal numbers, or such as when a name is uttered and the name is not a known public figure (e.g., the name is likely associated with an individual whose information is unlikely to be ingested by the remote computer system), the remote computer system may prevent the question with the sensitive information being posted or otherwise provided to a secondary computer system (e.g., a system with a lower trust level than the system). The score may represent the likelihood that information in a question identified by the system from received voice data may include personal or otherwise sensitive information about a person (e.g., a person who asked the question or a person about whom the question was asked). The system may determine the number of times that a question has been asked by different users (e.g., the number of different voice-enabled devices from which voice data including a question have been identified), the type of information or data in a question, whether the information or data in a question includes sensitive information, such as character strings corresponding to a person's name, a number, a health-related term or phrase, a date, a location, or the like. The system may match the words determined from voice data (e.g., the words of a question) with a known question and/or template, and based on the matching words and words that complete any blank words in the template, may determine whether the words of a question are likely to include sensitive information. For example, entropy may refer to a measure of disorder in a system. When a question includes an unknown entity, the remote computer system may determine the entropy of a question, which may be directly or indirectly proportional to a risk score used to determine whether a question may be provided to a resource exterior to the remote computer system. A score may be based on manual review of a question and the feedback provided by manual review, indicating the likelihood that the question includes sensitive information.

At block 510, the system may determine whether the score satisfies a threshold. When the score indicates a high risk of undesirable disclosure of sensitive information (e.g., fails to satisfy the threshold), the question may not be provided to a secondary computer system, and the process 500 may continue at block 512. When the score indicates that the question has a low risk of undesirable disclosure of sensitive information (e.g., satisfies the threshold), the process 500 may continue at block 514.

At block 512, the system may update question parameters, such as the count or tally indicating the number of times the question has been identified so that the system may eventually send the question to a secondary computer system once the question has been posed more than a threshold number of times by multiple users. Other question parameters may include matching or partial matching information (e.g., whether the entire question matched received voice data or portions of the question matched the voice data). The question parameters may be used at block 510 for future scoring determinations that may consider how many times all or a part of a known question has been asked.

At block 514, the system may provide the question (e.g., the question data 240 of FIG. 2) to a secondary computer system (e.g., the one or more external resources 242 of FIG. 2). The secondary computer system may, at block 516, provide search results and/or user answers which may correspond to an answer to the question which the system was unable to answer internally. At block 518, the system may store the data as answer to the question when the system determines that the received data qualifies as an answer to the question. The system may update the count at 512 to track the number of times that the question has been identified (e.g., in whole or in part).

The embodiments described above are examples and are not meant to be limiting.

Figure 6:
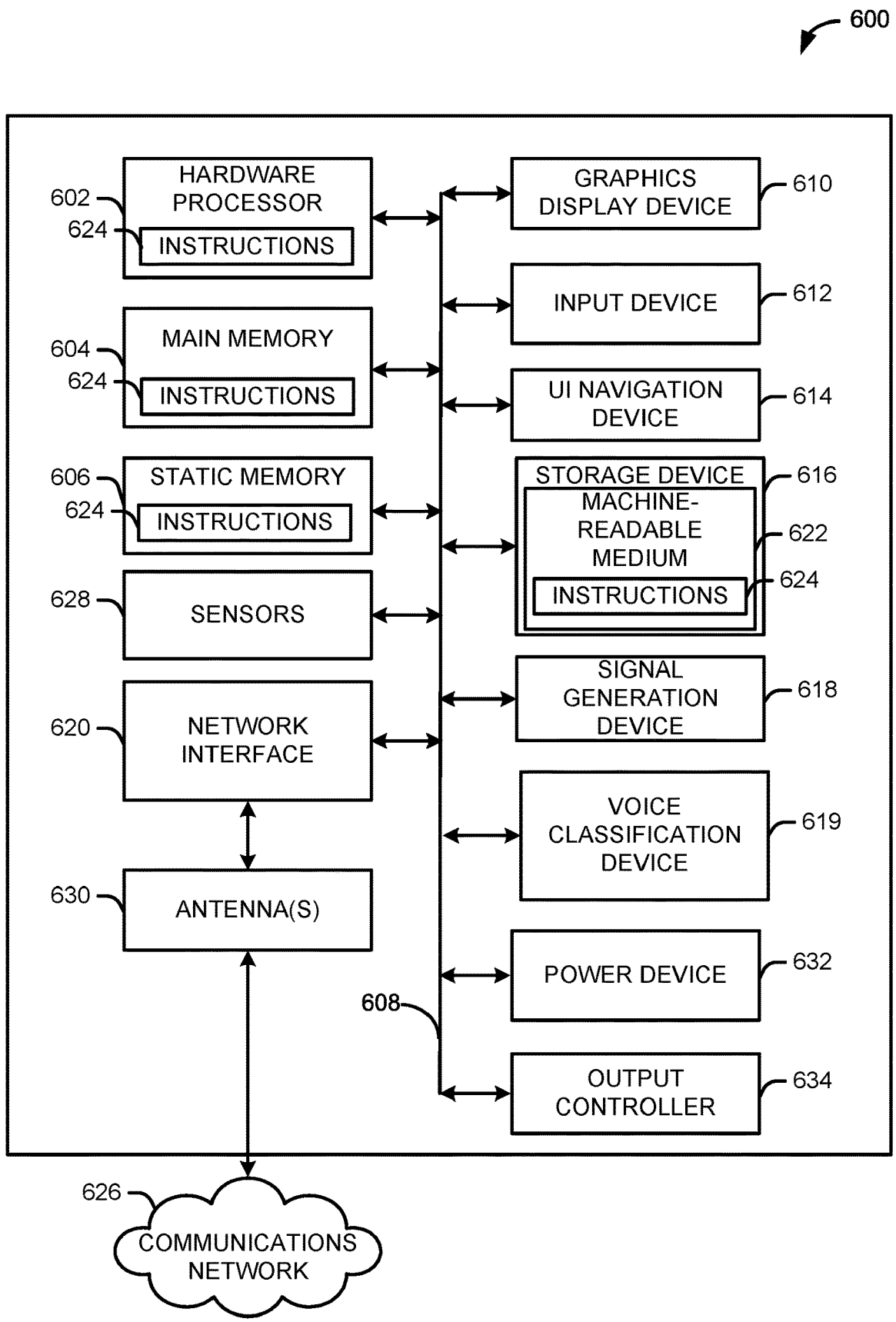
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the one or more voice-enabled devices 104 of FIG. 1, the remote network 110 of FIG. 1, the one or more external resources 112 of FIG. 1, the one or more voice-enabled devices 206 of FIG. 2, the remote network 215 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard, touch pad, buttons), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, a voice classification device 619, a network interface device/transceiver 620 coupled to antenna (s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a display, stereo receiver, media device, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The voice classification device 619 may carry out or perform any of the operations and processes (e.g., process 300 of FIG. 3, process 400 of FIG. 4, process 500 of FIG. 5) described and shown above.

In one or more embodiments, the voice classification device 619 may be implemented as part of a remote network (e.g., the remote network 110 of FIG. 1, the remote network 215 of FIG. 2). Users may utter voice commands, questions, and other voice data to devices that are capable of detecting sound. For example, voice-enabled devices may respond to certain sounds, words (e.g., a wake word), phrases, gestures, inputs, and the like, to trigger the recording of a user's voice (using appropriate user consent and applicable laws and regulations). Voice-enabled devices may allow a user to control devices (e.g., request the playback of content, turn devices on and off, etc.), to purchase items (e.g., from an online retailer), and to ask for information, such as the weather, recipes, directions, trivia, news, and the like. For example, user voice utterances such as "What is the capital of China?" "What are the ingredients needed to make spaghetti sauce?" "What is the weather?" "What was the score of the game?" and other questions may be received and identified by voice-enabled devices. When a voice-enabled device identifies a question, such as by identifying a wake word or phrase followed by one or more words uttered by a user, the voice-enabled device may send voice data (e.g., a recording or other representation of the voice utterance) to the voice classification device 619 for analysis and an answer. For example, when the voice utterance is "What is the weather?" the voice-enabled device may rely on the voice classification device 619 for an answer regarding the weather, and may announce or otherwise present the answer once the answer is provided (e.g., in the form of a voice recording to be rendered) to the voice-enabled device.

In one or more embodiments, the voice classification device 619 may receive voice data from voice-enabled devices that received voice utterance commands or questions. When the voice classification device 619 receives voice data from a voice-enabled device, the voice data may include an intent (e.g., play content, ask a question, control a device, etc.) and a value (e.g., the content to be played, the question to answer, the device to control, etc.). The voice classification device 619 may consider known questions and/or content templates to identify the intent of voice data. For example, the voice classification device 619 may store or have access to previously asked questions and templates with strings of words that are associated with questions. For example, a template may include entire questions (e.g., previously asked questions determined to be too risky or sufficiently low-risk) and/or questions with words and blanks, such as "What is the capital of _?" indicating that a user's intent is to ask a question regarding a capital city, and the "_" blank representing the location for which the capital city is inquired. The remote computer system may convert voice data to text using any voice-to-text method, and may extract the "_" blank words from voice data. The voice classification device 619 may identify answers using the extracted words without providing the question to a secondary computer system, and when an answer is not available, the voice classification device 619 may send the question to an external source when doing so would not violate any laws, policies, or sensitivity criteria.

In one or more embodiments, the voice classification device 619 may receive or otherwise subscribe to information from public and/or private databases. For example, the voice classification device 619 may ingest data from websites, libraries, forums, and other locations to store on the remote computer system. When the voice classification device 619 identifies a question included in received voice data, the voice classification device 619 may extract or otherwise identify words or phrases of a question, and may match the words or phrases to an answer. Using an example of "How far is New York from Los Angeles?" the voice classification device 619 may retrieve answers from the data ingested from public and/or private databases. In this manner, the voice classification device 619 may identify the answers to questions without providing any data from the questions to resources to a secondary computer system. For example, rather than posting a question using a public search engine or forum, the voice classification device 619 may determine answers to questions without exposing potentially sensitive information associated with a person. However, in some situations, the voice classification device 619 may not have an available answer within the voice classification device 619 or within the remote network, and may rely on public resources to identify an answer to a received question.

In one or more embodiments, to avoid providing sensitive information associated with a person, such as a person's name, contact information, medical references, political or religious views, financial information, health information, or other sensitive data as further disclosed herein and/or as defined by applicable privacy laws and regulations and/or user preferences, the voice classification device 619 may evaluate questions for their risk associated with disclosing sensitive information of people, and when the risk is low enough (e.g., below a threshold), the remote computer system may provide question data to resources of a secondary computer system to identify an answer. When the risk is too high (e.g., exceeds a threshold), the remote computer system may prevent the question from being provided to a secondary computer system to protect sensitive user information.

In one or more embodiments, to determine whether a question has information sensitive to a person, the voice classification device 619 may consider a variety of criteria (e.g., score criteria), and may use any combination of manual and automatic evaluation. For example, human operators may evaluate questions and provide feedback to the voice classification device 619 to use when evaluating whether questions include sensitive information that should not be provided to a secondary computer system. The voice classification device 619 may determine (e.g., based on a location of the voice-enabled device from which the voice data was received) applicable data privacy laws and regulations, and sensitivity criteria (e.g., some information may be considered sensitive in some locations, but not in others, and/or a name may be known as a public figure in one location, but not in another, etc.). Sensitivity criteria may include, but is not limited to, a full name (e.g., first and last name), a home address (e.g., a street name and/or number), an email address, a personal identifier (e.g., social security number, passport number, etc.), a vehicle number, a driver's license number, a credit card or bank account number, a user login name or handle, a date of birth, a birthplace, a genetic sequence, a telephone number, health-related information, legal information, rewards numbers, location data, racial/ethnic information, gender-related information, personal belief information, personal relationship information, and the like. The remote computer system may identify relevant local laws and regulations along with sensitivity criterion. When a question includes information that matches a sensitivity criteria, such as a string of numbers having the same length as a sensitive personal number or uttered in a question which asks who has the uttered sensitive personal numbers, or such as when a name is uttered and the name is not a known public figure (e.g., the name is likely associated with an individual whose information is unlikely to be ingested by the voice classification device 619), the voice classification device 619 may prevent the question with the sensitive information being posted or otherwise provided to a secondary computer system.

In one or more embodiments, the voice classification device 619 may determine the number of times that a question has been asked by users (e.g., based on voice data received from multiple voice-enabled devices). The voice classification device 619 may store or have access to questions and/or may maintain a tally of the number of times that voice data includes a question that matches (e.g., word-for-word, letter-for-letter) a question template, or that is similar to a question template (e.g., using N-grams to determine that a number of words in voice data includes a threshold number of N-grams as a question template). The more times that the voice classification device 619 identifies a commonly asked question, the less likely that the question includes sensitive personal information that could be associated with a particular person.

In one or more embodiments, the voice classification device 619 may determine a score indicative of a disclosure of sensitive information associated with a person. The score may represent the likelihood that information in a question identified by the remote computer system from received voice data may include personal or otherwise sensitive information about a person (e.g., a person who asked the question or a person about whom the question was asked). The voice classification device 619 may determine the number of times that a question has been asked by different users (e.g., the number of different voice-enabled devices from which voice data including a question have been identified), the type of information or data in a question, whether the information or data in a question includes sensitive information, such as character strings corresponding to a person's name, a number, a health-related term or phrase, a date, a location, or the like. The voice classification device 619 may match the words determined from voice data (e.g., the words of a question) with a known question and/or template, and based on the matching words and words that complete any blank words in the template, may determine whether the words of a question are likely to include sensitive information. For example, entropy may refer to a measure of disorder in a system. When a question includes an unknown entity, the voice classification device 619 may determine the entropy of a question, which may be directly or indirectly proportional to a risk score used to determine whether a question may be provided to a resource exterior to the voice classification device 619 or a network. A score may be based on manual review of a question and the feedback provided by manual review, indicating the likelihood that the question includes sensitive information. When the score indicates a high risk of undesirable disclosure of sensitive information, the question may not be provided to an exterior resource. When the score indicates that the question has a low risk of undesirable disclosure of sensitive information, the question may be provided to an exterior resource.

It is understood that the above are only a subset of what the voice classification device 619 may be configured to perform and that other functions included throughout this disclosure may also be performed by the voice classification device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
receiving, at a first device, voice data associated with a voice utterance, wherein the first device is associated with a network;
determining that the voice data is associated with a question and a location;
retrieving first data from the network;
determining, based on the first data, an absence of an answer to the question;
determining, based on the absence of the answer, second data included in the question;
determining, based on the location, a data privacy policy and a sensitivity criteria, wherein the sensitivity criteria is associated with a character string;
determining, based on the second data, compliance with the data privacy policy;
determining an absence of the character string in the question;
sending the question to a second device, wherein the second device is remote from the network; and
receiving third data associated with the question.

2. The method of claim 1, wherein the character string is a first character string, and wherein the second data comprises a second character string, further comprising determining that the first data comprises the second character string, wherein sending the question to the second device is based on the determining that the first data comprises the second character string.

3. The method of claim 1, wherein the character string is associated with a number, wherein sending the question to the second device is based on the number in the question.

4. The method of claim 1, further comprising:
determining a number of times that characters of multiple words of the question have been identified, wherein the characters are associated with a portion of the question; and
determining that the number of times exceeds a threshold, wherein send the question to the second device is based on the number of times exceeding the threshold.

5. A method comprising:
receiving, at a first device, first voice data associated with a first voice utterance, wherein the first device is associated with a network;
receiving, at the first device, second voice data associated with a second voice utterance;
determining that the first voice data is associated with a first question;
determining that the second voice data is associated with a second question;
determining that a first answer to the first question is absent from the first device;

determining, based on the absence of the first answer from the first device, a first score associated with sending the first question to a second device remote from the network to be answered by the second device, the first score indicative of a first risk of disclosure of sensitive information associated with a first person;

sending, based on a comparison of the first score to a threshold, the first question to the second device;

determining that the network comprises a second answer to the second question;

based on determining that the network comprises the second answer to the second question, refraining from determining a second score associated with sending the second question to the second device to be answered by the second device, the second score indicative of a second risk of disclosure of sensitive information associated with a second person;

based on determining that the network comprises the second answer to the second question, refraining from sending the second question to the second device; and receiving data associated with the first question.

6. The method of claim 5, wherein the first device is associated with a first trust level, wherein the second device is associated with a second trust level, wherein the first trust level is greater than the second trust level, and wherein determining the first score is based on a comparison of the first trust level to the second trust level.

7. The method of claim 5, wherein the threshold is a first threshold, and wherein determining the first score comprises:

determining a number of times that a portion of the first question has been identified, wherein the portion comprises multiple words; and determining that the number of times that the portion of the first question has been identified exceeds a second threshold.

8. The method of claim 5, wherein a third question is a declassified question comprising fewer words than the first question, the method further comprising:

determining that a first N-gram of the first question matches a second N-gram of the declassified question, wherein determining the first score is based on the first N-gram and the second N-gram.

9. The method of claim 5, wherein the threshold is a first threshold, and wherein determining the first score comprises:

determining a number of times that the first question has been identified;

determining that the number of times that the first question has been identified is less than a second threshold;

determining, based on the number of times that the first question has been identified being less than a second threshold, sensitivity criteria associated with the first question, wherein the sensitivity criteria is associated with a character string;

determining an absence of the character string in the first question; and incrementing the number of times that the first question has been identified.

10. The method of claim 5, wherein determining the first score comprises determining an absence of a character string associated with a person's name, intellectual property, or birthplace.

11. The method of claim 5, wherein determining the first score comprises:

determining that the first voice data comprises a character string associated with a person's name; and identifying the person's name based on data stored in the network.

12. The method of claim 5, further comprising receiving, from one or more human operators, feedback associated with the disclosure of sensitive information, wherein determining the first score is further based on the feedback.

13. The method of claim 5, further comprising determining location data associated with the first voice data, wherein determining the first score is further based on the location data.

14. The method of claim 5, further comprising:

determining first characters of first words included in the first question;

determining a distance between the first characters and second characters of second words included in a third question having a third score less than the threshold; and determining that the distance is less than a second threshold, wherein determining the first score is further based on the distance.

15. The method of claim 5, wherein the first voice data is received with a user identifier, wherein sending the first question to the second device comprises sending the first question without the user identifier.

16. The method of claim 5, further comprising:

receiving, at the first device, third voice data associated with a third voice utterance;

determining that the third voice data is associated with a third question;

determining an absence of a third answer to the third question;

determining a third score associated with the third question; and determining a number of times that the third question has been identified, wherein the number of times is based on the third voice data.

17. A system comprising memory coupled to at least one processor, the at least one processor configured to:

receive first voice data associated with a first voice utterance, wherein the system is associated with a network;

receive second voice data associated with a second voice utterance;

determine that the first voice data is associated with a first question;

determine that the second voice data is associated with a second question;

determine that a first answer to the first question is absent from the system;

determine, based on the absence of the first answer from the system, a first score associated with sending the first question to a device remote from the network to be answered by the device, the first score indicative of a first risk of disclosure of sensitive information associated with a first person;

send, based on a comparison of the first score to a threshold, the first question to the device;

determine that the network comprises a second answer to the second question;

based on determining that the network comprises the second answer to the second question, refrain from determining a second score associated with sending the second question to the device to be answered by the device, the second score indicative of a second risk of disclosure of sensitive information associated with a second person;

based on determining that the network comprises the second answer to the second question, refrain from sending the second question to the device; and receive data associated with the first question.

18. The system of claim 17, wherein the threshold is a first threshold, and wherein to determine the first score comprises the at least one processor being further configured to:

determine a number of times that the first question has been identified;

determine that the number of times that the first question has been identified is less than a second threshold;

determine, based on the number of times that the first question has been identified being less than a second threshold, sensitivity criteria associated with the first question, wherein the sensitivity criteria is associated with a character string;

determine an absence of the character string in the first question; and increment the number of times that the first question has been identified.

19. The system of claim 17, wherein to determine the first score comprises the at least one processor being further configured to:

determine that the first voice data comprises a character string associated with a person's name; and identify the person's name based on data stored in the network, wherein the data stored in the network are associated with names of declassified people.

20. The system of claim 17, wherein the system is associated with a first trust level, wherein the device is associated with a second trust level, wherein the first trust level is greater than the second trust level, and wherein determining the first score is based on a comparison of the first trust level to the second trust level.

\* \* \* \* \*